US009615102B2

United States Patent
Gisquet et al.

(10) Patent No.: US 9,615,102 B2
(45) Date of Patent: Apr. 4, 2017

(54) METHOD AND APPARATUS FOR PROCESSING COMPONENTS OF AN IMAGE

(71) Applicant: CANON KABUSHIKI KAISHA, Tokyo (JP)

(72) Inventors: Christophe Gisquet, Rennes (FR); Edouard François, Bourg des Comptes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 13/659,825

(22) Filed: Oct. 24, 2012

(65) Prior Publication Data

US 2013/0114706 A1    May 9, 2013

(30) Foreign Application Priority Data

Oct. 25, 2011 (GB) .................................. 1118444.7

(51) Int. Cl.
*H04N 19/186* (2014.01)
*H04N 19/196* (2014.01)
(Continued)

(52) U.S. Cl.
CPC ......... *H04N 19/198* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS

| 7,881,372 B2 * | 2/2011 | Ishikawa .................. 375/240.03 |
| 2005/0053136 A1 * | 3/2005 | Yu ........................ H04N 19/176 |
| | | 375/240.16 |

(Continued)

FOREIGN PATENT DOCUMENTS

| GB | 2366679 A | 3/2002 |
| WO | 2008/020687 A1 | 2/2008 |

OTHER PUBLICATIONS

Chen, J. and Seregin, V., "Chroma intra prediction by reconstructed luma samples", Joint Collaborative Team on Video Coding (JCT-VC) of ITU-T SG16 WP3 and ISO/IEC JTC1/SC29/WG11, 3rd Meeting: Guangzhou, CN, Input document to JCT-VC, Document No. JCTVC-C206 (Oct. 11, 2010).*

*Primary Examiner* — William C Vaughn, Jr.
*Assistant Examiner* — Lindsay Uhl
(74) *Attorney, Agent, or Firm* — Canon USA, Inc. I.P. Division

(57) ABSTRACT

A method for processing components of an image for coding a sample of the image, the image being composed of a first type of component and a second type of component, wherein samples of the second type of component are predictable from samples of the first type of component using a prediction model, computing one parameter value for use in representing, in the prediction model, the link between the first type of component and the second type of component; detecting, whether or not, one type of error exists in one such computed parameter value of the prediction model and in the case where a first type of error is detected; adapting the computed parameter value to correct for the error detected; and predicting a sample of the second type from a sample of the first type using the prediction model and the adapted parameter value.

39 Claims, 7 Drawing Sheets

(51) Int. Cl.
*H04N 19/105* (2014.01)
*H04N 19/176* (2014.01)
*H04N 19/593* (2014.01)
*H04N 19/11* (2014.01)
*H04N 19/117* (2014.01)
*H04N 19/463* (2014.01)
*H04N 19/137* (2014.01)

(52) U.S. Cl.
CPC ......... *H04N 19/117* (2014.11); *H04N 19/137* (2014.11); *H04N 19/176* (2014.11); *H04N 19/186* (2014.11); *H04N 19/463* (2014.11); *H04N 19/593* (2014.11)

(56) References Cited

U.S. PATENT DOCUMENTS

2011/0255591 A1* 10/2011 Kim et al. ............... 375/240.02
2012/0236934 A1*  9/2012 Chen et al. .............. 375/240.03
2013/0182761 A1*  7/2013 Chen .................... H04N 19/593
                                                    375/240.02

* cited by examiner

| if lm_alpha_available( ) { | C | Descriptor |
|---|---|---|
| { | 0 | u(2) |
| if ( ) { | 0 | |
| type_1_alpha[C][S] | 0 | C×S×u(4) |
| } | 0 | |
| if ( ) { | 0 | u(2) |
| type_2_alpha[C][S] | 0 | C×S×u(4) |
| type_3_alpha[C][S] | 0 | C×S×u(4) |
| type_4_alpha[C][S] | 0 | C×S×u(4) |
| } | 0 | |
| ... | | |
| } | | |

Fig. 5

METHOD AND APPARATUS FOR PROCESSING COMPONENTS OF AN IMAGE

This application claims priority from GB Patent Application No. 1118444.7 filed Oct. 25, 2011, which is hereby incorporated by reference herein in its entirety.

The present invention concerns a method and device for processing components in an image. The invention further relates to a method and a device for encoding an image, and to a method and device for decoding an image.

At least one embodiment of the invention is applicable in the field of intra coding of chroma samples of video data.

Video data is typically composed of a series of still images or frames which are shown rapidly in succession as a video sequence to give the visual impression of a moving image. Video applications are continuously moving towards improved image resolution (greater number of pixels per frame, higher frame rate, higher bit-depth . . . ). A large quantity of video content is distributed in digital form via broadcast channels, digital networks and packaged media, with a continuous evolution towards improved quality and resolution (e.g. higher number of pixels per frame, higher frame rate, higher bit-depth or extended colour gamut). This evolution in technology puts increased pressure on distribution networks that already face difficulties in providing HDTV (high definition television) resolution and data rates economically to the end user. Consequently, further increases in data rate will put additional pressure on such distribution networks. To address this challenge, ITU-T (International Telecommunications Union, telecommunications Standardization Sector) and ISO/MPEG decided to launch a new video coding standard project in January 2010, known as High Efficiency Video Coding (HEVC). It will be appreciated that in what follows the term "HEVC" is used to represent the current implementation of HEVC, which is in course of standardization and will be subject to evolution.

HEVC codec design is similar to that of most previous so-called block-based hybrid transform codecs such as H.263, H.264, MPEG-1, MPEG-2, MPEG-4, SVC. Video compression algorithms, such as those standardized by the standardization bodies ITU, ISO and SMPTE, use spatial and temporal redundancies of images in order to generate data bit streams of reduced size. Spatial redundancy represents the mutual correlation between adjacent image pixels, while temporal redundancy represents the correlation between images of sequential images. Such compression processes make the transmission and/or storage of video sequences more effective.

During video compression in HEVC, each block of an image being processed is predicted spatially by an "Intra" predictor (so-called "Intra" coding mode), or temporally by an "Inter" predictor (so-called "Inter" coding mode). Each predictor is a block of pixels obtained from the same image or another image, from which a difference block (or "residual") is derived. In the Intra coding mode the predictor (Intra predictor) used for the current block (prediction block) is a block of pixels constructed from the information already encoded of the current image.

An image of the video data to be transmitted may be provided as a set of two-dimensional arrays (also known as colour channels) of sample values, each entry of which represents the intensity of a colour component such as a measure of luma brightness and chroma colour deviations from neutral grayscale colour toward blue or red (YUV) or as a measure of red, green, or blue light component intensity (RGB).

A YUV model generally defines a colour space in terms of one luma (Y) and two chrominance (UV) components. Generally Y stands for the luma component (the brightness) and U and V are the chrominance (colour) or chroma components.

Among the various technologies in use in HEVC codec, one is the luma-based chroma prediction, which uses a linear model in a block to link luma components to chroma components. The parameters of the model may be determined on the fly, using the borders and a least-mean square method.

The following model is given as example for generating an estimation of, i.e. predicting, the variable Y:

$$\hat{Y} = \sum_{i=1}^{N} a_i X_i \qquad (1)$$

where:
the $X_i$ values are input to the prediction model, for instance from other signals or previous values of the Y signal;
the $a_i$ factors, ranging from 1 to N, are parameters ("weights") for each input;
in the case for example where $X_0=1$, $a_0$ is a constant term
In order to determine the model parameters, the quadratic error of the model for the Y signal over the pixels, indexed with n is expressed as:

$$e_C = \sum_n \left( Y_n - \sum_{i=1}^{N} a_i X_i \right)^2 \qquad (2)$$

The least mean square method tries to determine the $a_i$ parameters minimizing this error value. The possible minimum where all derivatives with respect to said parameters are null may be considered as:

$$\forall i, \frac{\partial e_C}{\partial a_i} = 0 \Rightarrow \sum_n X_i \left( Y_n - \sum_{i=1}^{N} a_i X_i \right) = 0 \qquad (3)$$

This can be rewritten as follows, showing that a classical system of N linear equations with N unknowns to solve, is obtained:

$$\forall i, \sum_n a_i \sum_{k=1}^{N} X_{k,n} X_{i,n} = \sum_n X_{i,n} Y_n \qquad (4)$$

That can be expressed as a matrix system which is symmetrical, and on which known matrix solving algorithms such as the Gauss pivot can be used. The $a_i$ parameters may therefore be determined.

When coding a chroma block as intra (i.e. the chroma block depends on previously coded/decoded data from the current image), particular prediction modes can be applied, e.g. a directional bilinear prediction or a prediction by an average value. In all cases, the outer borders of the chroma block which may be referred to as a Coding Unit (hereafter CU), located inside of previously decoded CUs, are used.

Those borders therefore contain decoded pixel data, to which particular filtering might have been applied.

The prediction mode presented in this example relies on an affine model, corresponding to what is presented above:

$$C_{pred}[x,y] = \alpha \cdot L'[x,y] + \beta \quad (5)$$

Here, the values of the prediction block made up of the pixels C[x,y] are linearly derived from the virtual luma values L'[x,y] which are in turn derived from the collocated decoded luma values.

The model parameters are found using a Least Mean Square method as presented above.

With reference to FIG. 1, the model parameters are determined using encoded chroma samples on the top border 102 and left border 101 of the chroma block and co-located encoded luma samples from the top border 105 and left border 104, each border lying on the outside of the co-located luma block. The signals used as inputs are:

For the computation of the parameters α and β:
  L' values on left border 104 are obtained through filtering the decoded $Rec_L$ value located on the column immediately on the left with the vertical convolution filter 107, resulting in the output: where Rec refers to reconstructed $$L'[-1,y] = (Rec_L[-1,2y] + Rec_L[-1,2y+1]) \gg 1 \quad (6)$$

L' values on top border 105 are filtered using the horizontal convolution filter 108, resulting in the output:

$$L'[x,-1] = (Rec_L[2x-1,-1] + 2Rec_L[2x,-1] + Rec_L[2x+1,-1]) \gg 2 \quad (7)$$

For the values 106 used in the prediction, the filter 107 described for the left border is reused but on a different column:

$$L'[x,y] = (Rec_L[2x,2y] + Rec_L[2x,2y+1]) \gg 1 \quad (8)$$

Note that in a classical YUV4:2:0 colour space, the nominal position of the chroma sample inside a 2×2 luma block is in the middle of the left luma column, corresponding to the 2x horizontal position in the above formulas.

For such a simple model, the solution can be easily expressed analytically as:

$$\alpha = \frac{N \sum_{i=1}^{N} C_i L'_i - \sum_{i=1}^{N} C_i \sum_{i=1}^{N} L'_i}{N \sum_{i=1}^{N} L'^2_i - \left(\sum_{i=1}^{N} L'_i\right)^2} = \frac{N \cdot XY - X \cdot Y}{N \cdot XX - X \cdot X} = \frac{A_1}{A_2} \quad (9)$$

with N being the number of input samples in the borders and the sums simplified as XY, X, Y and XX X corresponding to $$N \sum_{i=1}^{N} L'_i$$

and Y corresponding to $$N \sum_{i=1}^{N} C_i$$

(notations that are used in what follows). Identically, we have for the constant parameter:

$$\beta = \frac{\sum_{i=1}^{N} C_i - \alpha \sum_{i=1}^{N} L'_i}{N} = \frac{Y - \alpha \cdot X}{N} \quad (10)$$

Another detail is that when using arithmetic with 32-bits signed architectures, some computations may on occasion overflow and thus cause unspecified behavior (which is strictly prohibited in any cross platform standard). To this end, the maximum magnitude possible given the input $L'_i$ and $C_i$ values is computed, and N and the sums are scaled accordingly to guarantee that no overflow occurs.

However, estimated parameters may be erroneous or unreliable thereby leading to inaccurate coding and a loss of coding efficiency. Some causes for such errors or unreliability are non-stationarity of the signal, and quantization of the signals on the outer borders.

The present invention has been devised to address one or more of the foregoing concerns.

According to a first aspect of the invention there is provided A method of processing components of an image for coding or decoding of a sample of the image, the image being composed of at least a first type of component and a second type of component different to the first type of component, wherein samples of the second type of component are predictable from samples of at least the first type of component using a prediction model linking the first type of component to the second type of component, the method comprising:

computing at least one parameter value for use in representing, in the prediction model, the link between the first type of component and the second type of component;

detecting, whether or not, at least one type of error exists in the or one said computed parameter value of the prediction model and in the case where an error is detected;

adapting the or one said computed parameter value to correct for the error detected; and predicting a sample of the second type from a sample of the first type using the prediction model and the adapted at least one parameter value.

Consequently, erroneous parameter values including unreliable parameter values may be detected and corrected thereby increasing coding efficiency while maintaining a low level of complexity for both an encoder and a decoder.

In one embodiment the method includes determining whether at least one of a plurality of different types of error exists and adapting of the computed at least one parameter value is dependent upon the type of error detected.

In one embodiment, detection of whether or not at least one type of error exists is based on data collected from a plurality of samples of the image for computation of the at least one parameter value of the said prediction mode.

In one embodiment, detection of whether or not at least one type of error exists is based on properties of the image.

In one embodiment, the data is collected from a plurality of reconstructed samples of the second type, neighbouring the sample to be coded, and a plurality of reconstructed samples of the first type, neighbouring a collocated sample of the first type.

In one embodiment, the first type of component is a luma component and the second type of component is a chroma component In one embodiment, data is collected from N chroma samples on the top border and left border of the chroma sample to be coded, and N luma samples from the top border and left border of a co-located luma sample.

In some embodiments, the type of error detected may be at least one of a plurality of predetermined error types and wherein at least one predetermined parameter value is associated with each predetermined type of error for adapting the computed at least one parameter value In an embodiment, the step of detecting whether or not, an error exists comprises determining the effect of quantization on neighbouring samples of the image from which the sample being coded is predicted.

In an embodiment the step of detecting whether or not, an error exists comprises determining whether or not the computed parameter value lies in a predetermined range In an embodiment the step of detecting, whether or not, an error exists comprises comparing the computed parameter value with at least one predetermined threshold In an embodiment the predetermined threshold is adaptable in dependence on properties of the image In an embodiment the step of adapting the computed at least one parameter value based on the type of error detected comprises evaluating the performance of a plurality of potential parameter values In an embodiment the performance evaluation is performed for a plurality of parameter values and interpolation based on previous evaluations is performed on other parameter values.

In an embodiment the at least one parameter value is adapted based on the size of the unit of samples being coded and/or the component index.

In an embodiment the prediction model is based on the expression:

$$C_{pred}[x,y] = \alpha \cdot L'[x,y] + \beta$$

where: $C_{pred}[x,y]$ corresponds to a group of samples of the second component $L'_{pred}[x,y]$ corresponds to a group of samples of the first component $\alpha$ and $\beta$ are model parameters of the prediction model N corresponds to number of samples used for the prediction, wherein the values of model parameters $\alpha$ and/or $\beta$ are adapted according to the type of error detected.

In one particular embodiment the method includes transmitting corrective information representative of an outcome of the detection of whether or not one type of error exists in the computed at least one parameter value for enabling at least one parameter value, adapted in dependence on the corrective information, to be used, by a receiving device, for prediction of a sample of the second type from a sample of the first type.

A second aspect of the invention relates to a device for processing components of an image for coding or decoding of a sample of the image, the image being composed of at least a first type of component and a second type of component different to the first type of component, wherein samples of the second type of component are predictable from samples of at least the first type of component using a prediction model linking the first type of component to the second type of component, the device comprising:

a parameter computation module for computation of at least one parameter value representing the link between the first type of component and the second type of component;

an error detection module for detecting, whether or not, at least one type of error exists in the or one said computed at least one parameter value of the prediction model for determining a type of error detected;

a correction module for adapting the computed at least one parameter value to correct for the error detected; and a prediction module for predicting a sample of the second type from a sample of the first type using the prediction model and the adapted at least one parameter value.

In one particular embodiment the error detection module is configured to detect if at least one of a plurality of different types of error exists and wherein the correction module is configured to adapt the computed at least one parameter value in dependence upon the type of error detected.

In an embodiment the device is provided with data collection module for collecting data from a plurality of samples of the image, and parameter computation module for computation of the at least one parameter value of the said prediction mode wherein the error detection module is configured to determine whether or not an error exists based on the collected data.

In an embodiment the error detection module is configured to detect whether or not at least one type of error exists based on properties of the image.

In an embodiment the data collection module is configured to collect data from a plurality of reconstructed samples of the second type, neighbouring the sample to be coded, and a plurality of reconstructed samples of the first type, neighbouring a collocated sample of the first type.

In an embodiment the first type of component is a luma component and the second type of component is a chroma component In an embodiment the data collection module is configured to collect data from a plurality of N chroma samples on the top border and left border of the chroma sample to be coded, and N luma samples from the top border and left border of a co-located luma sample.

In an embodiment the error detection module is configured to detect at least one of a plurality of predetermined error types wherein at least one predetermined parameter value is associated with each predetermined type, the correction module being configured to adapt the computed at least one parameter value based on the associated at least one predetermined parameter.

In an embodiment the error detection module is configured to determine the effect of quantization on neighbouring samples of the image from which the sample being coded is predicted.

In an embodiment the error detection module is configured to determine whether or not the computed parameter value lies in a predetermined range In an embodiment the error detection module is configured to compare the computed parameter value with at least one predetermined threshold In an embodiment the predetermined threshold is adaptable in dependence on properties of the image In an embodiment the correction module is configured to adapt the computed at least one parameter value based on the evaluation of the performance of a plurality of potential parameter values In an embodiment the device is provided with an evaluation module for performing performance evaluation on a plurality of parameter values and interpolation module for interpolating performance evaluation of parameter values based on previous evaluations.

In an embodiment the correction module is configured to adapt the at least one parameter value based on the size of the unit of samples being coded and/or the component index.

In an embodiment the prediction module is configured to perform the prediction based on the prediction model expressed as:

$$C_{pred}[x,y] = \alpha \cdot L'[x,y] + \beta$$

where: $C_{pred}[x,y]$ corresponds to a group of samples of the second component $L'_{pred}[x,y]$ corresponds to a group of samples of the first component $\alpha$ and $\beta$ are model parameters of the prediction model N corresponds to number of samples used for the prediction, wherein the values of model parameters $\alpha$ and/or $\beta$ are adapted according to the type of error detected.

In one particular embodiment a transmission module are provided for transmitting corrective information representative of an outcome of the detection of whether or not one type of error exists in the computed at least one parameter value, for enabling at least one parameter value, adapted in dependence on the corrective information, to be used, by a receiving device, for prediction of a sample of the second type from a sample of the first type.

A further aspect of the invention provides a method of encoding an image including a step of processing components of the image for encoding of a sample of the image, according to any one of the embodiments of the first aspect of the invention, and a step of encoding the image.

A yet further aspect of the invention provides a method of decoding an image including a step of processing components of the image for decoding of a sample of the image, according to any one of the embodiments of the first aspect of the invention, and a step of decoding the image.

Another aspect of the invention provides a device for encoding an image comprising a device for processing components of the image for encoding of a sample of the image according to any one of the embodiments of the second aspect of the invention.

Another aspect of the invention provides a device for decoding an image comprising a device for processing components of the image for decoding of a sample of the image according to any one of the embodiments of the second aspect of the invention.

A further aspect of the invention provides a signal carrying an information dataset for an image represented by a video bitstream, the image being composed of at least a first type of component and a second type of component different to the first type of component, wherein samples of the second type of component are predictable from samples of at least the first type of component using a prediction model linking the first type of component to the second type of component, the link being represented by at least one model parameter, the information dataset comprising: corrective information representative of the outcome of the detection of an error in a computed value of at least one model parameter, for enabling the at least one parameter value, adapted according to the error detected, to be used, by a receiving device, for prediction of a sample of the second type from a sample of the first type.

In one embodiment the corrective information includes data representative of a type of error detected.

A further aspect of the invention provides a video bitstream representative of an image composed of at least a first type of component and a second type of component different to the first type of component, wherein samples of the second type of component are predictable from samples of at least the first type of component using a prediction model linking the first type of component to the second type of component, the link being represented by at least one model parameter and including a signal according to the previous aspect of the invention.

Another aspect of the invention provides a method of processing components of an image for decoding of a sample of the image, the image being composed of at least a first type of component and a second type of component different to the first type of component, wherein samples of the second type of component are predictable from samples of at least the first type of component using a prediction model linking the first type of component to the second type of component, the link between the first type of component and the second type of component being represented by at least one model parameter of the prediction model, the method comprising:

receiving a bitstream representative of the image and corrective information representative of the outcome of a detection of at least one type of error in a computed value of the or one said model parameter;

decoding samples of the first type;

adapting the or one said model parameter based on the corrective information; and predicting a sample of the second type from at least one decoded sample of the first type using the prediction model and the adapted the or one said parameter value.

A further aspect of the invention provides a decoding device for processing components of an image for decoding of a sample of the image, the image being composed of at least a first type of component and a second type of component different to the first type of component, wherein samples of the second type of component are predictable from samples of at least the first type of component using a prediction model linking the first type of component to the second type of component the link between the first type of component and the second type of component being represented by at least one parameter of the prediction model the device comprising:

receiving module for receiving a bitstream representative of the image and corrective information representative of the outcome of a detection of an error in a computed value of the or one said model parameter;

corrective module for adapting the or one said model parameter value, based on the corrective information; and predictive module for predicting a sample of the second type from a sample of the first type using the prediction model and the adapted the or one said model parameter value.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:

FIG. 1 schematically illustrates examples of sampling of luma samples and chroma samples for prediction of a chroma block which may be applied in the context of one or more embodiments of the invention;

FIG. 5 illustrates a format according to an embodiment of the invention for transmitting information related to corrective data for correcting a model parameter.

Figure 1:
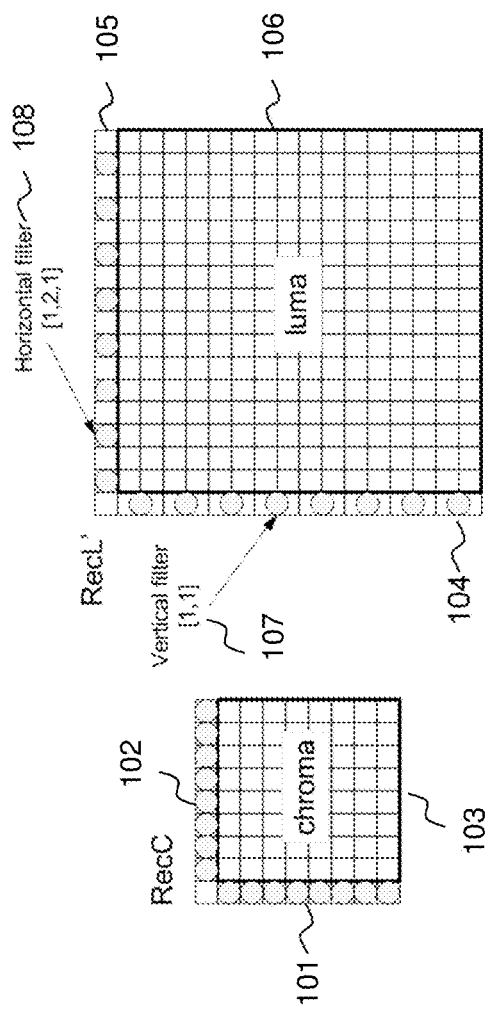
Figure 2:
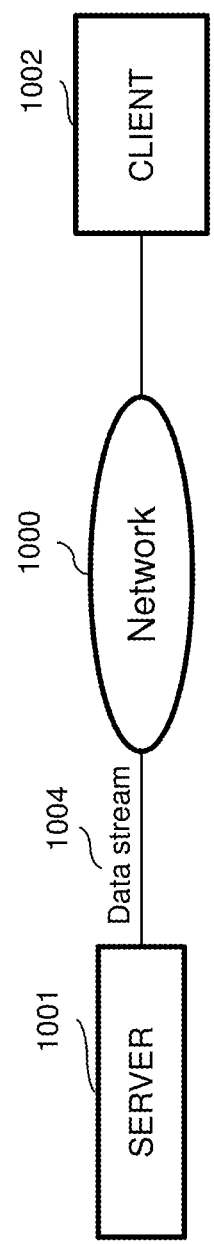
FIG. 2 is a schematic diagram of a data communication network in which one or more embodiments of the invention may be implemented.

FIG. 2 illustrates a data communication system in which one or more embodiments of the invention may be implemented. Although a streaming scenario is considered here, the data communication can be performed using for example a media storage device such as an optical disc. The data communication system comprises a transmission device, in this case a server 1001, which is operable to transmit data packets of a data stream to a receiving device, in this case a client terminal 1002, via a data communication network 1000. The data communication network 1000 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 1001 sends the same data content to multiple clients.

The data stream 1004 provided by the server 1001 may be composed of multimedia data representing video and audio data. Audio and video data streams may, in some embodiments of the invention, be captured by the server 1001 using a microphone and a camera respectively. In some embodiments data streams may be stored on the server 1001 or received by the server 1001 from another data provider, or generated at the server 1001. The server 1001 is provided with an encoder for encoding video and audio streams in particular f to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 1002 receives the transmitted bitstream and decodes the reconstructed bitstream to reproduce video images on a display device and the audio data by a loud speaker.

In one or more embodiments of the invention an encoded video image is transmitted with a brightness component (luma) and two colour components (chroma). The digital representation of the video signal thus includes a luma signal (Y), representative of brightness, and colour difference (or chroma) signals Cb (blue-Y) and Cr (red-Y).

It will be appreciated that while the detailed examples related to a YUV model the invention is not limited thereto, and may be applied to other models such as a RGB, or for encoding any image composed of several colour components, at least one colour component being considered as a reference colour component, the other colour components being dependently coded based on this reference colour component.

In at least one embodiment of the invention a luma-based chroma prediction mode in accordance with HEVC techniques may be applied to predict chroma samples from luma samples which have already been reconstructed. In the case of different resolutions of luma and chroma an interpolation process is applied to luma samples to generate interpolated luma samples at the same resolution as the chroma samples to be predicted.

A generalised embodiment of the invention will now be described as an illustrative example of the invention.

If intermediate model parameter values A1 and A2, used in expression (9) to calculate model parameter value $\alpha$, are potentially affected by quantization on borders in a decoded signal, then the $\alpha$ value cannot be determined to be reliable and is thus considered as erroneous. A model parameter potentially affected by quantization noise may be considered to be a first type of error If the computed model parameter $\alpha$ is in a particular range, it may be considered that a second type of error exists in parameter $\alpha$, that may depend on the sign of $\alpha$ and thus on the sign of intermediate parameter value A1, since intermediate parameter value A2 is always positive Furthermore, in a particular embodiment which provides correction of model parameter $\alpha$ based on the size of the block of samples being processed, the following conditions for correction of the prediction parameter $\alpha$ for a chroma block may be applied sequentially or in combination:

For example, a chroma block of size of 4×4 and:
A1 and A2 are below a threshold
$\alpha$ is in a particular negative range
$\alpha$ is in a particular positive range For a chroma block of size of 8×8 or 16×16, identical subcases with same thresholds may be applied.

This allows it to be determined as to when to apply corrective steps to correct the model parameter. Another part of some embodiments of the invention is to determine what to perform during these corrective steps to provide a replacement model parameter $\alpha$ value. In a particular embodiment, the context of the image and the error type are taken into account and an alternative $\alpha$ value is used.

In order to find the corrective $\alpha$ value to be used the encoder, one particular embodiment of the invention evaluates the performance of several possible $\alpha$ value values contained in arrays in 2 steps:

during encoding analysis (during which coding modes are evaluated and compared to each other), an update mechanism evaluates a score related to the local performance of these candidate $\alpha$ value values in the context of the detected error After analysis of the candidate $\alpha$ values, the $\alpha$ value with the best score is selected, and its index into the array is transmitted.

Various parts of the invention will now be described in more detail with reference to illustrative embodiments.

Figure 3:
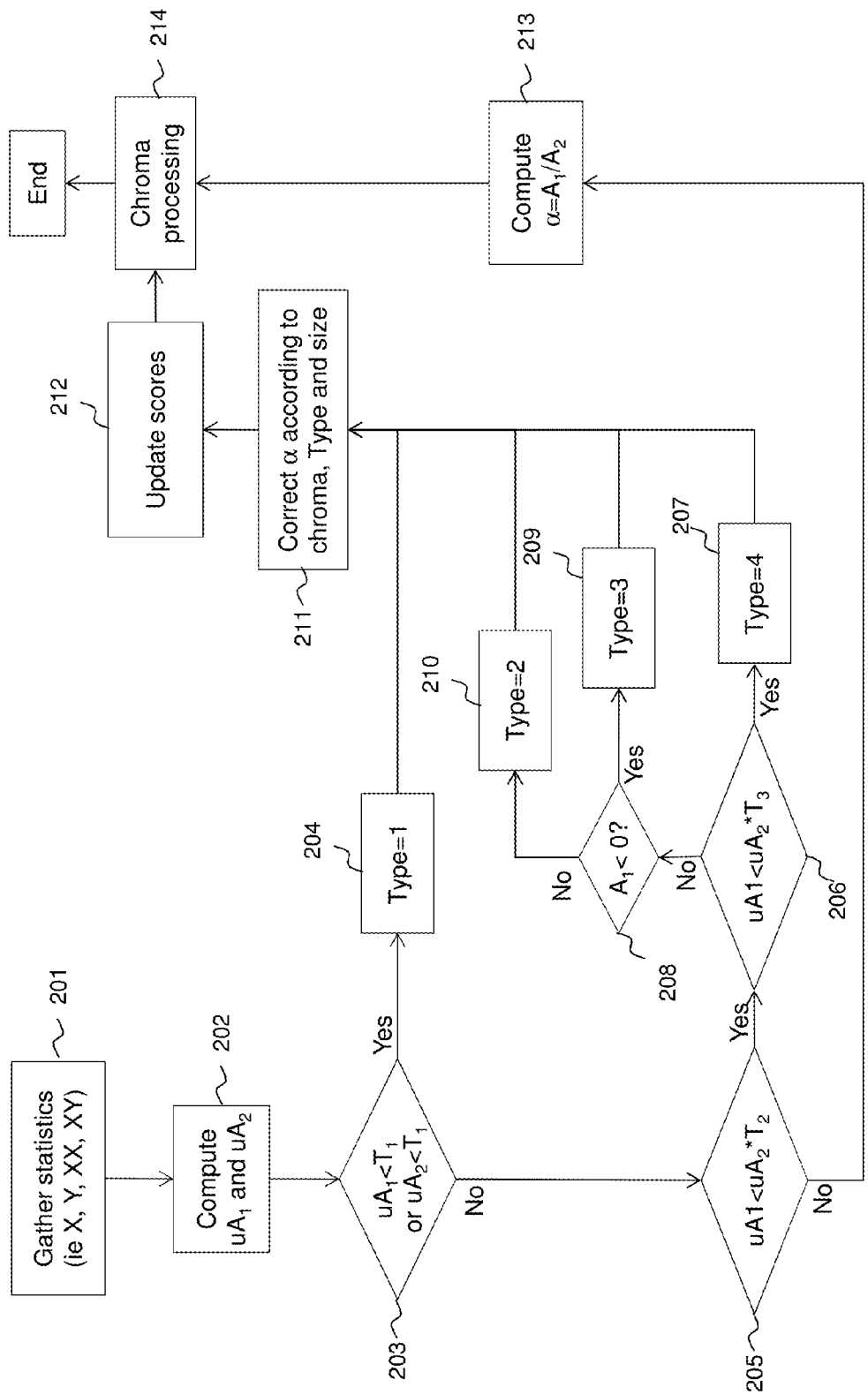
FIG. 3 is a flow chart illustrating steps of a method for detecting an error in a model parameter in accordance with an embodiment of the invention.

FIG. 3 illustrates steps of a method of processing components of an image for encoding of the image in accordance with at least one embodiment of the invention. This process, in this particular embodiment is inserted into a HEVC process. In this embodiment a block of chroma samples may be predicted from luma samples by applying the mode defined in formula (5). In an initial step of the process, statistical data referred to as X, XY, XX and Y, in accordance with expression (9) is collected in step 201. The collection of the statistical data then enables intermediate parameters $A_1$ and $A_2$ values and their corresponding absolute values $uA_1$ and $uA_2$ to be computed in step 202.

Error detection is then performed, starting at step 203 where the effect of quantization is evaluated: if $uA_1$ and/or $uA_2$ are below a first threshold $T_1$, then it may be considered that a quantization error has affected $A_1$ and $A_2$ too much. Given $2^N$ samples on the borders of the chroma block, a bitdepth of n representing the sample values, and a quantizer parameter value of QP, we have $T_1=QP<<(N+n-1)$ with $N+n-1$ guaranteed to be positive and "<<" as the classical bitshifting operator (shifting by $N+n-1$ bits described in numerous video coding standards. It will be appreciated that in further embodiments additional parameters can be considered to tailor the threshold according the context of the prediction process, such as the chroma component index, other local statistics (such as estimated quantization noise). In addition, the encoder may find a factor $f_1$ so that $T'_1=f_1 T_1$ is used instead. $f_1$ would account at a global scale for the particular behavior of the current frame, and with $f_1=0$ (e.g. $f_1$ can depend on the frame coding type, such as intra-frame, mono-predictive inter-frame, bi-predictive inter-frame), to completely deactivate the detection of this type of error.

If such an error is detected in step 203, then the type of error is set to a predetermined identifier (e.g. 1, with 0 indicating no error) in step 204 followed by step 211 in which model parameter α is corrected as will be subsequently detailed. Otherwise, the presence of another type of error is evaluated in step 205. In that case, it is checked as to whether or not the final parameter value α falls within a particular range $[-T_2;T_2]$, with $T_2=5/32$ in a preferred embodiment, i.e. $-T2<\alpha<T2$. This is done for 2 reasons:

Although the values of model parameter α found may not exhibit significant error and be correctly determined, the ideal value of prediction model parameter α varies across the image, and the value of α formerly computed may not be suitable for another part of the image;

There is usually an average α value across the image that may be interesting, all the more if the outliers (outside of $[-T_2;T_2]$) are better determined by the original method in step 213; however the average value may be significantly skewed, and it is worthwhile considering another type of error related to this skew.

Again, the threshold might be modulated by a factor $f_2$, depending for instance on the behavior within the image. If no such error is detected, then the original method is applied in step 213 by computing the α value as $A_1/A_2$ and chroma prediction processing is directly applied by going to step 214. Otherwise, step 206 verifies that α falls within a particular range $[-T_3;T_3]$, with $T_3=1/32$ in a preferred embodiment. If it is found that parameter α falls within a particular range $[-T_3;T_3]$, then error type 4 is selected in step 207. Again, the encoder may find a factor $f_3$ such that $T'_3=f_3 T_3$ (and $T_3<T_2$) is used instead, by the preferred embodiment. Otherwise in step 208 the sign of $A_1$ is checked: if negative, error type 2 is selected in step 210, otherwise error type 3 is selected in step 209. In any case where there is an error detected (be it 1, 2, 3 or 4), the processing continues with step 211, which involves applying the corrective step.

In one particular embodiment, corrective step 211 entails setting the α value to a predetermined value depending on the block size, chroma component index and error type as previously mentioned. However, in an alternative embodiment a linear combination of the computed parameter value $\alpha=A_1/A_2$ obtained without error correction and the value of α obtained with the process of the embodiment of FIG. 3 may be used in case of errors with weights either fixed once for all, or alternatively updated based on further information provided by the encoder. In another embodiment a corrective value to add to the α parameter value (either corrected or not in an update process) may be determined, usually by testing several possibilities and signaling explicitly which potential α parameter value performed best under some metric such as distortion or Lagrangian cost in a rate/distortion-optimized encoder.

Figure 4:
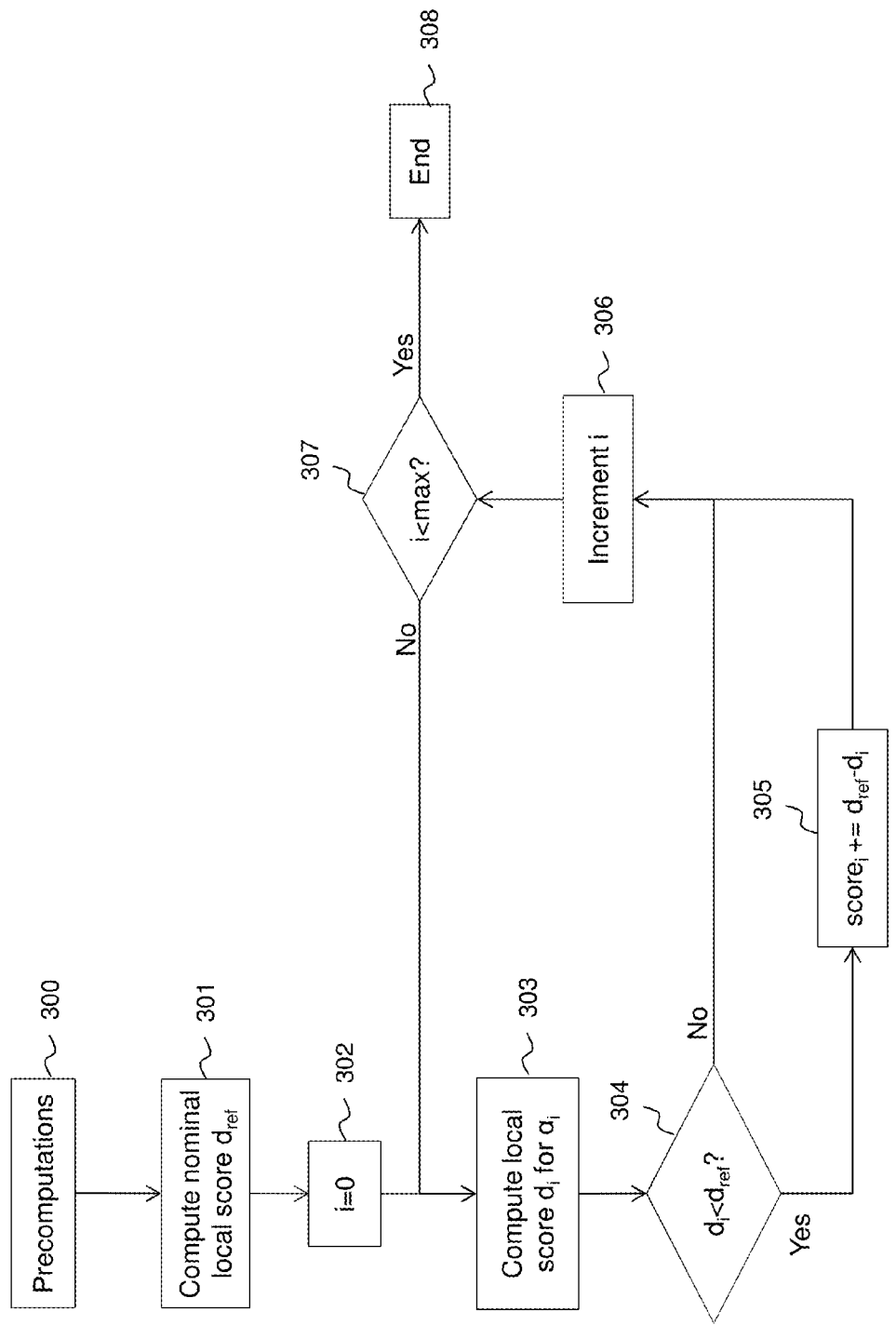
FIG. 4 is a flow chart illustrating steps of a method for determining a replacement model parameter value in accordance with an embodiment of the invention.

Once a new value for the α parameter has been found, an optional update mechanism for updating the global scores of the possible predetermined values of α further detailed with reference to the flow chart of FIG. 4, is triggered in step 212. In one particular embodiment, as further detailed in what follows, a update mechanism may be formed during the encoding analysis (where different coding modes and block sizes for the various components are evaluated), however depending on the type of error detected, the updating mechanism may be performed through various other scenarios such as:

multi-pass encoding to find the best values for a current image image analysis, either on the original image or the decoded image, in particular for determining jointly the α parameter values and the threshold modulation factors $f_1$ and/or $f_2$ values, using classification algorithms such as the kmeans algorithm Then, the chroma prediction processing step 214 may be performed in which chroma samples are predicted from luma samples according to the prediction model defined by expression (5). Since the particular embodiment relies on correcting the α value, classical processing can be applied once this is done. This involves computing the β value as described above with reference to expression (10), and finally determining the prediction using the determined α and β parameters of the model.

In a particular embodiment of the invention an exhaustive search among candidate α parameter values is performed. As will be appreciated, several other algorithms may be used instead of this to find a candidate α parameter values, as mentioned previously. The algorithm is performed at the encoder side: what is then transmitted to the decoder are the final $\alpha_i$ values for each type of error and image context, and thus the choice of the parameters below or the actual method is free. It may be noted that the choice of parameter value α may be optimized according to the type of error, the block size and the chroma component. The algorithm could be extended to jointly evaluate all of these conditions, in particular as the U chroma component might exhibit an improvement and not the V chroma component.

In one particular embodiment of the invention corrective information representative of the outcome of the type of error detected may be encoded for transmission to a decoder device. The corrective information may include data for correcting the model parameter such as data representing the type of error detected, or data representative of a corrected model parameter.

An algorithm for finding the optimal α parameter according to a particular embodiment of the invention is illustrated in the flow chart of FIG. 4. The algorithm is initialized in step 300, by performing some pre-computations that will be made clear in the description which follows.

Since the encoder can test several chroma prediction modes besides the luma-based prediction mode, the luma based prediction mode will only be picked if it is the most suitable chroma prediction mode of available chroma prediction modes. This also means in the case where an α parameter value is deemed to be particularly unsuitable for the prediction model, another prediction mode may be used instead.

In order to evaluate this effect, a nominal local score $d_{ref}$ is computed in step 301, approximating in a particular embodiment the performance of a DC prediction mode (i.e. the use of an average value to predict the chroma signal). This is made in a preferred embodiment by computing the DC value on the samples (in this case pixels) of the inner top and left borders of the original block for optimal performance of the algorithm. In alternative embodiments other sets of samples around the original block, or the decoded block may be used. The choice of samples to use for computing the DC value may be dictated by a target in terms of coding efficiency and computational complexity of the measurements.

In order to simplify computations, in one embodiment an approximation of the sum of squared errors is used, although it will be appreciated that in alternative embodiments of the invention other kind of distortions (sum of absolute errors, etc) or even scores may be used. The expression of for determining the nominal score $d_{DC}$ for DC prediction where N is the number of pixels used for computing the DC value ($b_{DC}$ here) and M is the number of pixels of the zone for the distortion measurement:

$$d_{DC} = \sum_{k=1}^{M} (C_k - b_{DC})^2 \text{ with } b_{DC} = \frac{1}{N}\sum_{i=1}^{N} C_i \quad (11)$$

It may be noted that the $b_{DC}$ and $d_{DC}$ values can be computed on entirely different sets of pixels, either in terms of number of pixels or origin (spatial location and original/decoded) of the pixels. In a particular embodiment, $b_{DC}$ is computed on pixels of the inner top and left borders of length 4 (thus N=8) of the original 4×4 block, while $d_{DC}$ (and other local scores) are computed on the whole of that block (thus M=16). Of course, the sets of pixels chosen are a compromise between computational complexity and coding efficiency.

Once this computation is done, the various $\alpha_i$ parameter candidates will be tested. To this end, step 302 initiates the evaluation by setting a loop counter i over the $\alpha_i$ to 0. In a particular embodiment 16 values of $\alpha_i$ are tested (thereby allowing binary coding on 4 bits of the index of the optimal value), which are:

Among the set $\{-11, -9, -7, -6, -5, -4, -3, -2, -1, 1, 2, 3, 4, 5, 7, 9\}/2^B$ With B=6 for error type 1, B=7 for error type 4 and B=5 for error types 2 and 3.

The core of the loop then starts in step 303 with the computation of the local score for $\alpha_i$. Given this value, the corresponding $\beta_i$ value may then be obtained as described with reference to expression (10). Consequently, assuming this local score could be computed by the sum of squared errors between the prediction block produced by using $\alpha_i$ and the original block, i.e.:

$$d_i = \sum_{k=1}^{M} (C_k - \text{clip}(\alpha_i L'_k + \beta_i))^2 \quad (12)$$

Although not strictly equivalent, the following may be used:

$$d_i = \sum_{k=1}^{M} (C_k - \alpha_i L'_k + \beta_i)^2 \quad (13)$$

Indeed, as for $d_{DC}$, this allows the computation to be simplified. To show this, the computation for $d_{DC}$ may be decomposed as follows:

$$d_{DC} = \sum_{k=1}^{M}(C_k^2 + b_{DC}^2 - 2C_k b_{DC}) = \sum_{k=1}^{M}(C_k^2) + M \cdot b_{DC}^2 - 2b_{DC}\sum_{k=1}^{M}(C_k) \quad (14)$$

And equivalently for $d_i$:

$$d_i = \sum_{k=1}^{M}(C_k^2 + \alpha_i^2 L_k'^2 + \beta_i^2 + 2\alpha_i\beta_i L'_k - 2\alpha_i C_k L'_k - 2\beta_i C_k) = \quad (15)$$

$$\sum_{k=1}^{M}(C_k^2) + \alpha_i^2 \sum_{k=1}^{M}(L_k'^2) + M \cdot b_i^2 +$$

$$2\alpha_i\beta_i\sum_{k=1}^{M}(L'_k) - 2\alpha_i\sum_{k=1}^{M}(C_k L'_k) - 2\beta_i\sum_{k=1}^{M}(C_k)$$

It is now supposed that the following terms are precomputed:

$$C_2 = \sum_{k=1}^{M} C_k^2 \quad (16)\text{-}(20)$$

$$C = \sum_{k=1}^{M} C_k$$

$$L = \sum_{k=1}^{M} L'_k$$

$$L_2 = \sum_{k=1}^{M} L_k'^2$$

$$L_C = \sum_{k=1}^{M} C_k L'_k$$

The previous values may then be expressed as:

$$d_{DC} = C_2 + M \cdot b_{DC}^2 - 2b_{DC}C \quad (21)$$

$$d_i = C_2 + \alpha_i^2 L_2 + M \cdot \beta_i^2 + 2\alpha_i\beta_i \cdot L - 2\alpha_i L_C - 2\beta_i \cdot C \quad (22)$$

the computation of the above expressions may then be further simplified:

$C_2$ is present in all terms, and does not need to be computed;

By properly selecting the $\alpha_i$ values and the numbers M and N, the computations may still be performed by arithmetic on 32 bits values with shifts (as is implied by the values tested described earlier);

By computing only half of the $d_i$ scores and interpolating the others; the preferred embodiment computes the scores for the even $d_{2i}$ values and uses linear interpolation for the others:

$$d_{2i+1} = \frac{d_{2i}(\alpha_{2i+1} - \alpha_{2i}) + d_{2i+2}(\alpha_{2i+2} - \alpha_{2i+1})}{\alpha_{2i+2} - \alpha_{2i}} \quad (23)$$

Returning to the flowchart of FIG. 4: assuming the C, L, $L_2$ and $L_C$ values detailed previously have been already precomputed in step 300, computations in steps 301 and 303 are pretty straightforward.

As explained earlier, if any $\alpha_i$ value degrades the local score compared to another type of prediction mode, luma based prediction mode will not be selected for use. As a consequence, step 304 checks whether $d_i < d_{DC}$, in which case the global $score_i$ is incremented by the positive improvement $d_{DC} - d_i$ in step 305.

Next, the loop counter i is incremented on step 306 to prepare to evaluate next $\alpha_i$ value. Step 307 checks whether we have already reached the last value, in which case analysis for the block ends on step 308, otherwise, we loop back to step 303.

Once the coding unit (slice or frame) has finished the encoding process, selecting the optimal $\alpha_i$ value for a given chroma component, error type and block size is simply a matter of selecting the one having the highest $score_i$ value.

The $score_i$ values may then refreshed either by zeroing them or scaling by some value (for example in a particular embodiment the score values may be halved)

This is performed to control the stability in the selection of $\alpha_i$: past performance of a particular $\alpha_i$ can be kept for reference. The performance of a particular $\alpha_i$ measured on one coding element for one frame may not guarantee it to be selected for another.

Signalization in the bitstream of the corrective information according to an embodiment of the invention will now be described with reference to FIG. 5.

The corrective information may be signaled in:
a slice header
an image header
an adaptively sent information unit, such as a picture or sequence parameter set, or the "Adaptive Slice Parameter Set" as in current HEVC The signalization starts with a check Im_alpha_available( ) to determine whether the corrective information is present. This check may rely on:
An implicit rule (the information may only/always be present within an intra coding unit, and optionally/ never for other types of coding units)
An explicit rule (a bit signals whether the information is present)

As mentioned earlier the threshold T can be modulated by a modulation factor f. In an alternative embodiment, information pertaining to said first modulation factor for a first type of error is signaled in an f_1 element (equivalent to the modulation factor $f_1$). A 2 bits binary element is used in this embodiment, but in alternative embodiments this may be a 1 bit binary element (signalling whether or not it is 0) and 2 other bits for the actual value. This would then provide from 4 to 5 possible values, among which the 0 value, which indicates whether or not the error type 1 is to be detected, and thus corrected with the information following.

Consider the coding of images with C+1 components (the first one being the luma in a particular embodiment, where C=2) and S sizes (S=2 in the particular embodiment, one being 4×4 and the other standing for both 8×8 and 16×16). Again in the particular embodiment, as the model is affine, only 1 parameter is sent per component/size combination, but alternative embodiments may signal as many parameters as seen fit. Therefore, the following signalling is the type_1_alpha[C][S] element containing C×S values. The preferred embodiment uses for each value a binary word of 4 bits representing the index of the optimal α, as there are 16 candidate values.

For such kind of particular element, one may however imagine the following coding methods being applied:
Variable-length coding of the index
Predictive coding of the index depending on previous indices for either a previous error type, size or component, for instance
For a given component and error type, we may want to predict the α index for block size 2 (i.e. 8×8 and 16×16 blocks) with the one for block size 1 (i.e. 4×4 blocks)
For error type 3, (where α>0) of a given component and size, we may want to predict its index with the index of the opposite context, i.e. for error type 2; with the examples α values as given above, if type 2 uses value −4 (and thus its index is 6), then type 3 index will be predicted with 11 (the index of value −(−4))

It can be understood that, although a linear layout has been selected, values can be interleaved with the exact same result in decoded information. And again, depending on the number of error types used, the above description can be repeated, with appropriate prediction or not, as is illustrated by the repetition for error type 2, 3 and 4 of the various possible syntax elements, i.e. the f_2 value. One thing to note here is that the same threshold value T is used.

If an f_1 and/or f_2 value is set to 0, a decoding device receiving such information may consider that no corresponding correction is to be applied to model parameter values.

Figure 6:
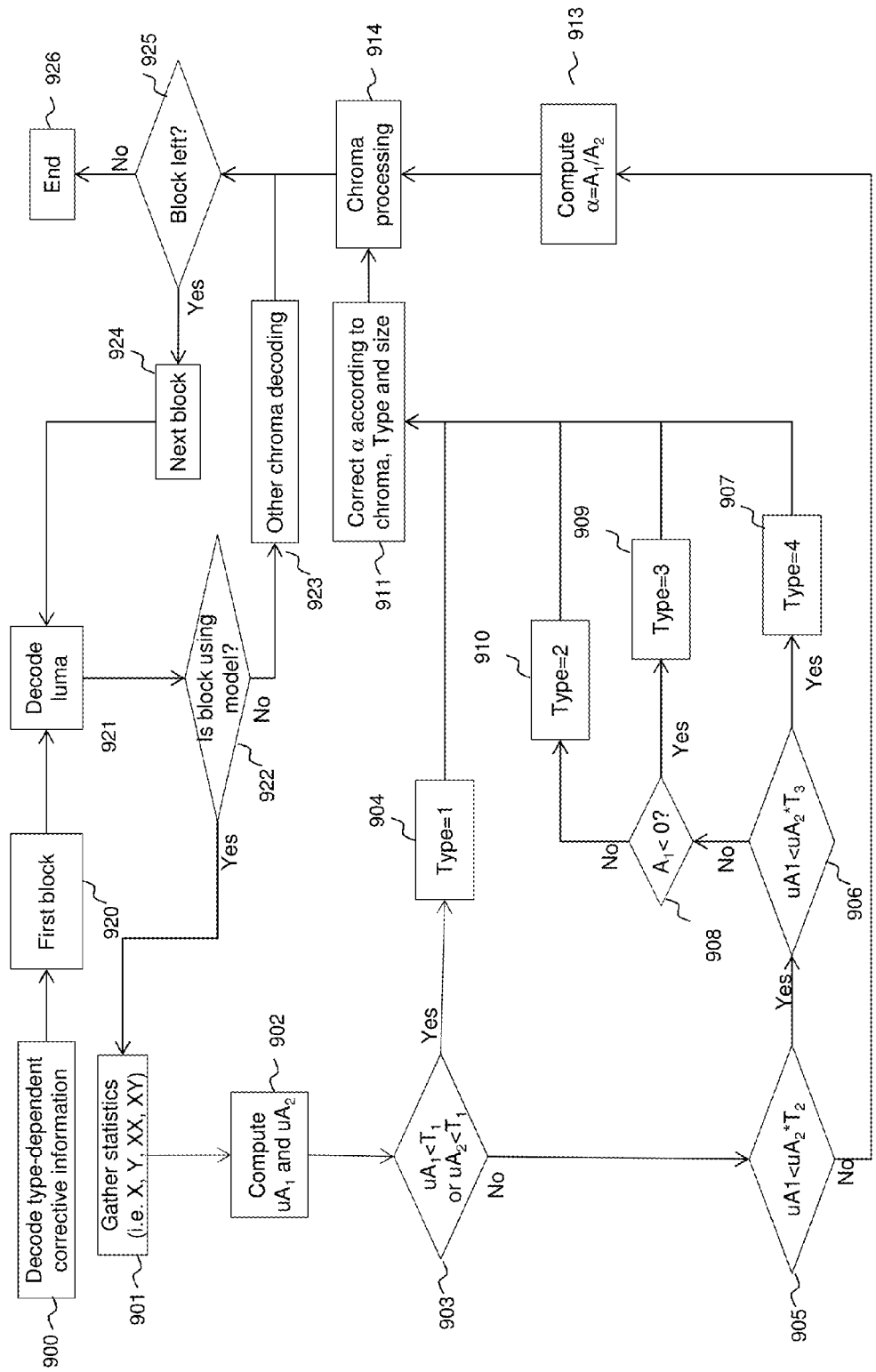
FIG. 6 is a flow chart illustrating steps of a method for adapting a model parameter for prediction of samples in a decoding process in accordance with an embodiment of the invention.

FIG. 6 illustrates steps of a method of processing components of an image for decoding of the image in accordance with at least one embodiment of the invention. This process, in this particular embodiment is inserted into a HEVC process and may be the corresponding decoding process of the encoding process illustrated in FIG. 3. In this embodiment a block of chroma samples may be predicted from decoded luma samples by applying the prediction model defined in formula (5). In an initial step of the process, 900 bitstream information including data representative of an image to be decoded and corrective information, such as illustrated in FIG. 5, for the various error types of computed model parameters as described above is received and decoded by a decoder of a receiving device. Step 920 initializes the decoding loop over the chroma blocks of the received image. In step 921 luma samples are decoded along with any information relevant to further decoding of chroma samples. The decoded luma samples may then be used in the chroma sample prediction process. Step 922 then checks whether the current chroma block uses a predetermined parametric model, such as that defined by equation (5), for the prediction of chroma samples. In some embodiments of the invention this check may be based on information encoded in the bitstream. If in step 922 it is determined that the predetermined parametric model is not to be used the process proceeds to step 923 where another chroma decoding process is implemented (for example a chroma decoding process based angular prediction, etc). The process proceeds to step 925 which determines whether or not there are blocks (chroma+luma) left to be decoded, before ending step 926 in the case where it is determined that no further blocks are left to be processed. If further blocks remain to be processed the next block is selected in step 924 and the decoding loops back to step 921.

Otherwise, if it is determined in step 922 that the predetermined parametric model is to be used the sequence of steps 901 to 914 are implemented for detecting a least one type of error type in a computed model parameter and correcting the parameter accordingly. Steps 901 to 914 perform the same function as described for corresponding steps 201 to 214 of FIG. 3.

Step 925 checks whether or not there are blocks (chroma+luma) left to processed. If no blocks are left to be processed it is considered that the image is fully decoded, and the process ends on step 926. If yes, next block is selected on step 924, and decoding loops back to step 921.

In an alternative embodiment in which a decoding device receives corrective information from an encoding device which has already performed the error detections steps, steps 902 to 907 may be replaced by a step in which corrective information is read from the bitstream and correction step 911 involves correcting the model parameter α based on the corrective information. Alternatively step 914 may involve directly applying a received corrected model parameter value to the prediction model for predicting the chroma samples.

Figure 7:
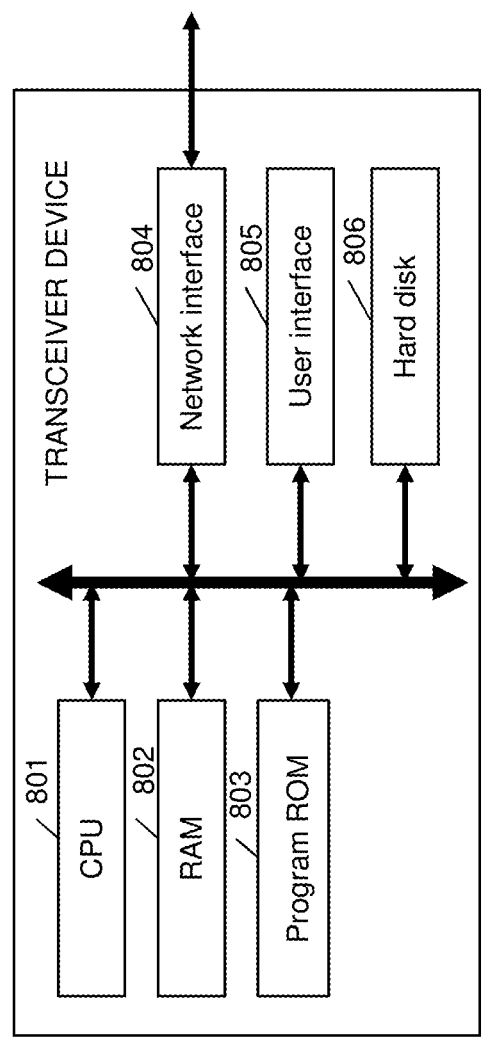
FIG. 7 is a block diagram of an encoding device or a decoding device in which embodiments of the invention may be implemented.

FIG. 7 illustrates a block diagram of a receiving device such as client terminal 1002 of FIG. 2 or transmitting device, such as server 1001 of FIG. 2 which may be adapted to implement embodiments of the invention. The method of FIG. 3 may be implemented in the device in the case of a transmitting device including an encoder, or the method of FIG. 6 may be implemented in the case where the device is a receiving device and comprises a decoder for decoding the image.

The device 800 comprises a central processing unit (CPU) 801 capable of executing instructions from program ROM 803 on powering up of the device 800, and instructions relating to a software application from a main memory 802 after powering up of the device 800. The main memory 802 may be for example of a Random Access Memory (RAM) type which functions as a working area of the CPU 801, and the memory capacity thereof can be expanded by an optional RAM connected to an expansion port (not illustrated). Instructions relating to the software application may be loaded into the main memory 802 from a hard-disc (HD) 806 or the program ROM 803 for example. Such a software application, when executed by the CPU 801, causes the steps of the method of embodiments of the invention to be performed on the device.

The device 800 further includes a network interface 804 enabling connection of the device 800 to the communication network. The software application when executed by the CPU is adapted to receive data streams through the network interface 804 from other devices connected to the communication network in the case of a receiving device and to transmit data streams through the network interface 804 in the case of a transmitting device.

The device 800 further comprises a user interface 805 to display information to, and/or receive inputs from a user.

Although the present invention has been described hereinabove with reference to specific embodiments, the present invention is not limited to the specific embodiments, and modifications will be apparent to a skilled person in the art which lie within the scope of the present invention.

For example although embodiments of the present invention have been described with reference to the prediction of chroma components from luma components, the invention may be applied to other type of image components.

Moreover, while the described embodiments relate to a HEVC scenario, the concept of the invention can be extended to:

- Lossless coding, e.g. of Bayer raw grid, where the first type of error may have a different meaning, e.g. α values around 0, as this first type of error for lossy coding schemes is related to the effect of lossy coding
- Non-block-based coding scheme, in which case the borders should be more broadly understood as samples in the neighborhood around the element being coded (e.g. sample)
- Other linear models, e.g. quadratic or predicting the V chroma component (e.g. of index 0) from Y and U (e.g. the chroma component of index 1)

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of processing components of an image for coding or decoding of a sample of the image, the image being composed of at least a first type of component and a second type of component different to the first type of component, wherein samples of the second type of component are predictable from samples of at least the first type of component using a prediction model linking the first type of component to the second type of component, the method comprising:

computing at least one parameter value for use in representing, in the prediction model, the link between the first type of component and the second type of component, two intermediate model parameter values being used in computing the at least one parameter value;

detecting, whether or not, at least one type of error exists in at least one such computed parameter value of the prediction model and in the case where at least a first type of error is detected;

determining at least one of a plurality of different types of error as a function of the values of said two intermediate model parameters, said determining comprising comparing said intermediate model parameter values with at least one predetermined threshold, and depending on the result of said comparison, said determining further comprising determining whether or not the computed parameter value lies in a predetermined range;

adapting the at least one such computed parameter value to correct for the error detected depending upon the type of error detected; and predicting at least one sample of the second type from a sample of the first type using the prediction model and the adapted at least one parameter value.

2. A method according to claim 1, further comprising determining whether at least one of a plurality of different types of error exists wherein adapting of the computed at least one parameter value is dependent upon the type of error detected.

3. A method according to claim 1, wherein detection of whether or not at least a first type of error exists is based on data collected from a plurality of samples of the image for computation of the at least one parameter value of the said prediction mode.

4. A method according to claim 1, wherein detection of whether or not at least one type of error exists is based on properties of the image.

5. A method according to claim 3, wherein the data is collected from a plurality of reconstructed samples of the second type, neighbouring a group of samples to be predicted, and a plurality of reconstructed samples of the first type, neighbouring a group of collocated samples of the first type.

6. A method according to claim 1, wherein the first type of component is a luma component and the second type of component is a chroma component.

7. A method according to claim 6, wherein data is collected from N chroma samples on the top border and left border of the group of chroma samples to be predicted, and N luma samples from the top border and left border of a co-located group of luma samples.

8. A method according to claim 2, wherein the type of error detected may be at least one of a plurality of predetermined error types and wherein at least one predetermined parameter value is associated with each predetermined type of error for adapting the computed at least one parameter value.

9. A method according to claim 1, wherein the step of detecting whether or not, at least one type of error comprises determining the effect of quantization on neighbouring samples of the image from which the at least one sample being coded or decoded is predicted.

10. A method according to claim 1, wherein the predetermined threshold is adaptable in dependence on properties of the image.

11. A method according to claim 1, wherein the step of adapting the computed at least one parameter value based on the type of error detected comprises evaluating the performance of a plurality of potential parameter values.

12. A method according to claim 11 wherein the performance evaluation is performed for a plurality of parameter values and interpolation based on previous evaluations is performed on other parameter values.

13. A method according to claim 1, wherein the at least one parameter value is adapted based on the size of the group of samples being coded and/or the component index.

14. A method according to claim 1 wherein the prediction model is based on the expression:

$$C_{pred}[x,y] = \alpha \cdot L'[x,y] + \beta$$

where: $C_{pred}[x,y]$ corresponds to a group of samples of the second component $L'_{pred}[x,y]$ corresponds to a group of samples of the first component $\alpha$ and $\beta$ are model parameters of the prediction model, wherein the values of model parameters $\alpha$ and/or $\beta$ are adapted according to the type of error detected.

15. A method according to claim 1, further comprising transmitting corrective information representative of an outcome of the detection of whether or not one type of error exists in the computed at least one parameter value for enabling at least one parameter value, adapted in dependence on the corrective information, to be used, by a receiving device, for prediction of a sample of the second type from a sample of the first type.

16. A method of encoding an image including a step of processing components of the image for encoding of a sample of the image, according to claim 1, and a step of encoding the image.

17. A method of decoding an image including a step of processing components of the image for decoding of a sample of the image, according to claim 1, and a step of decoding the image.

18. A device for processing components of an image for coding or decoding of a sample of the image, the image being composed of at least a first type of component and a second type of component different to the first type of component, wherein samples of the second type of component are predictable from samples of at least the first type of component using a prediction model linking the first type of component to the second type of component, the device comprising:

a memory;

a processor coupled to the memory which executes the following:

computation of at least one parameter value representing the link between the first type of component and the second type of component, two intermediate model parameter values being used in computing the at least one parameter value;

detecting, whether or not, at least one type of error exists in the at least one such computed at least one parameter value of the prediction model;

determining at least one of a plurality of different types of error as a function of the values of said two intermediate model parameters, said determining comprising comparing said intermediate model parameter values with at least one predetermined threshold, and depending on the result of said comparison, said determining further comprising determining whether or not the computed parameter value lies in a predetermined range;

adapting the at least one such computed parameter value to correct for the error detected depending upon the type of error detected; and predicting a sample of the second type from a sample of the first type and the adapted at least one parameter value.

19. A device according to claim 18, further comprising detecting if at least one of a plurality of different types of error exists and adapting the computed at least one parameter value in dependence upon the type of error detected.

20. A device according to claim 18, further comprising collecting data from a plurality of samples of the image, and determining whether or not at least one type of error exists based on the collected data.

21. A device according to claim 18, further comprising detecting whether or not at least one type of error exists based on properties of the image.

22. A device according to claim 20, further comprising collecting data from a plurality of reconstructed samples of the second type, neighbouring a group of samples to be predicted, and a plurality of reconstructed samples of the first type, neighbouring a collocated group of samples of the first type.

23. A device according to claim 18, wherein the first type of component is a luma component and the second type of component is a chroma component.

24. A device according to claim 23, further comprising collecting data from a plurality of N chroma samples on the top border and left border of the group of chroma samples to be coded, and N luma samples from the top border and left border of a group of co-located luma samples.

25. A device according to claim 19, further comprising detecting at least one of a plurality of predetermined error types wherein at least one predetermined parameter value is associated with each predetermined type, and adapting the at least one such computed parameter value based on the associated at least one predetermined parameter.

26. A device according to claim 18, further comprising determining the effect of quantization on neighbouring samples of the image from which the sample being coded is predicted.

27. A device according to claim 18, wherein the predetermined threshold is adaptable in dependence on properties of the image.

28. A device according to claim 18, further comprising adapting the at least one such computed parameter value based on the evaluation of the performance of a plurality of potential parameter values.

29. A device according to claim 28, further comprising performing performance evaluation on a plurality of parameter values and interpolation module for interpolating performance evaluation of parameter values based on previous evaluations.

30. A device according to claim 18, further comprising adapting the at least one parameter value based on the size of the group of samples being coded and/or the component index.

31. A device according to claim 18, further comprising performing the prediction based on the prediction model expressed as:

$$C_{pred}[x,y] = \alpha \cdot L'[x,y] + \beta$$

where: $C_{pred}[x,y]$ corresponds to a group of samples of the second component
$L'_{pred}[x,y]$ corresponds to a group of samples of the first component
$\alpha$ and $\beta$ are model parameters of the prediction model, wherein the values of model parameters $\alpha$ and/or $\beta$ are adapted according to the type of error detected.

32. A device according to claim 18, further comprising transmitting corrective information representative of an outcome of the detection of whether or not one type of error exists in the computed at least one parameter value, for enabling at least one parameter value, adapted in dependence on the corrective information, to be used, by a receiving device, for prediction of a sample of the second type from a sample of the first type.

33. A device for encoding an image comprising a device for processing components of the image for encoding of a sample of the image according to claim 18.

34. A device for decoding an image comprising a device for processing components of the image for decoding of a sample of the image according to claim 18.

35. A method of processing components of an image for coding or decoding of a sample of the image, the image being composed of at least a first type of component and a second type of component different to the first type of component, wherein samples of the second type of component are predictable from samples of at least the first type of component using a prediction model linking the first type of component to the second type of component, the link between the first type of component and the second type of component being represented by at least one parameter of the prediction model, two intermediate parameter values being used in computing the at least one model parameter, the method comprising:

receiving a bitstream representative of the image and corrective information representative of the outcome of a detection of at least one type of error in a computed value of at least one such model parameter;

decoding samples of the first type;

determining at least one of a plurality of different types of error as a function of the values of said two intermediate model parameters, said determining comprising comparing said intermediate model parameter values with at least one predetermined threshold, and depending on the result of said comparison, said determining further comprising determining whether or not the computed parameter value lies in a predetermined range;

adapting the at least one such model parameter based on the corrective information depending upon the type of error detected; and predicting a sample of the second type from at least one decoded sample of the first type using the prediction model and the adapted at least one said parameter value.

36. A method according to claim 35, wherein the corrective information includes data representative of a type of error detected.

37. A decoding device for processing components of an image for decoding of a sample of the image, the image being composed of at least a first type of component and a second type of component different to the first type of component, wherein samples of the second type of component are predictable from samples of at least the first type of component using a prediction model linking the first type of component to the second type of component the link between the first type of component and the second type of component being represented by at least one parameter of the prediction model, two intermediate parameter values being used in computing the at least one parameter value, the device comprising:

a memory;

a processor coupled to the memory which executes the following:

receiving a bitstream representative of the image and corrective information representative of the outcome of a detection of an error in a computed value of at least one such model parameter;

determining at least one of a plurality of different types of error as a function of the values of said two intermediate model parameters, said determining comprising comparing said intermediate model parameter values with at least one predetermined threshold, and depending on the result of said comparison, said determining further comprising determining whether or not the computed parameter value lies in a predetermined range;

adapting the at least one such computed parameter value, based on the corrective information depending upon the type of error detected; and predicting a sample of the second type from a sample of the first type using the prediction model and the adapted at least one parameter value.

38. A device according to claim 37, wherein the corrective information includes data representative of a type of error detected.

39. A non-transitory computer-readable storage medium storing instructions of a computer program for implementing a method, according to claim 1.

* * * * *